United States Patent [19]
Koike et al.

[11] Patent Number: 6,096,211
[45] Date of Patent: Aug. 1, 2000

[54] FLUID FILTERING APPARATUS FOR VEHICLE, FILTER ELEMENT AND METHOD FOR MANUFACTURING SAME

[75] Inventors: Hideyuki Koike; Osamu Yoshida; Kenji Yano, all of Hamakita, Japan

[73] Assignee: Toyo Roki Seiko Kabushiki Kaisha, Shizuoka-ken, Japan

[21] Appl. No.: 09/261,745

[22] Filed: Mar. 3, 1999

[30] Foreign Application Priority Data

Mar. 13, 1998 [JP] Japan .................................. 10-063492

[51] Int. Cl.⁷ .................................................. B01D 27/06
[52] U.S. Cl. ...................... 210/440; 210/450; 210/493.2; 210/496; 210/497.01; 156/73.1
[58] Field of Search .................................... 210/450, 453, 210/455, 440, 493.2, 493.1, 496, 497.01; 55/502; 156/73.1; 277/918

[56] References Cited

U.S. PATENT DOCUMENTS 3,567,022  3/1971  Thornton ............................... 210/440

FOREIGN PATENT DOCUMENTS 447875  9/1991  Germany .
773052  5/1997  Germany .

*Primary Examiner*—Matthew O. Savage
*Attorney, Agent, or Firm*—Young & Thompson

[57] ABSTRACT

A fluid filtering apparatus for a vehicle, which comprises: a filter element (2) provided with an element body (20) having a tubular shape and with a sealing member (21, 21) having a plate-shape, which is joined to each of opposite ends of the element body (20); a filter case (1) for receiving the filter element (2); and a pair of holding members (3, 4) coming into close contact with the sealing member (21) of the filter element (2) in an axial direction of the filter element (2) so as to divide an inside of the filter case (1) into a dirty-side zone (C1) and a clean-side zone (C2), between which the filter element (2) is placed. The sealing member (21) is joined to the element body (20) by ultrasonic fusion, which is applied exclusively to an outer peripheral portion (210) of the sealing member (21).

9 Claims, 5 Drawing Sheets

FLUID FILTERING APPARATUS FOR VEHICLE, FILTER ELEMENT AND METHOD FOR MANUFACTURING SAME

BACKGROUND OF THE INVENTION

1. Field of the Invention

The present invention relates to a fluid filtering apparatus used for filtering oil or the like for an automobile, and especially to a filter element of such a fluid filtering apparatus.

2. Description of the Related Art

As such a kind of apparatus there has already been known a filtering apparatus in which a tubular filter element received in a filter case, and the opposite ends of the filter element are sealed so as to divide the inside of the filter case into a dirty-side zone located on the outer peripheral side of the filter element and a clean-side zone located on the inner peripheral side thereof.

Such a filtering apparatus is provided with sealing members having a disc-shape disposed on the opposite ends of the filter element, respectively, in order to prevent fluid in the dirty-side zone from bypassing the filter element to flow into the clean-side zone. European Patent Publication No. 447875B1 discloses a structure in which the sealing member made of thermoplastic or the like and the end of an element body made of filter paper or the like are joined to each other by ultrasonic fusion. The joining structure utilizing the ultrasonic fusion makes it possible to reduce the steps and period of time required to join them in comparison with the other joining structure using hot melt adhesive or an ordinary adhesive agent. Incidentally, Japanese Patent Provisional Publication No. H6-31119 discloses a joining method in which thermoplastic resin contained in filtering members is fused by ultrasonic vibration so as to join these filtering members.

However, when the ultrasonic fusion is applied to the entire surface of the sealing member, the sealing member is hardened through a molten product caused by a fusing step, resulting in loss of resiliency of the sealing member over its entire surface. This deteriorates the function of the sealing member serving as packing, thus making it impossible to realize a sealing structure for bringing the sealing member into close contact with the other member.

SUMMARY OF THE INVENTION

An object of the present invention is therefore to provide a filtering apparatus, a filter element and a method for manufacturing the filter element, which permit to join a sealing member utilizing ultrasonic fusion and to seal the opposite ends of a filter element utilizing the resiliency of the sealing member.

The present invention will be described below. Reference numerals appearing in the accompanying drawings will be given to the following description with parentheses for facilitating the understanding of the present invention. The present invention is not however limited only to embodiments illustrated in the drawings.

The aforementioned object can be attained by a fluid filtering apparatus for a vehicle of the present invention, which comprises:

a filter element (2) provided with an element body (20) having a tubular shape and with a sealing member (21, 21) having a plate-shape, which is joined to each of opposite ends of said element body (20);

a filter case (1) for receiving said filter element (2); and a pair of holding members (3, 4) coming into close contact with said sealing member (21) of said filter element (2) in an axial direction of said filter element (2) so as to divide an inside of said filter case (1) into a dirty-side zone (C1) and a clean-side zone (C2), between which said filter element (2) is placed;

wherein:

said sealing member (21) is joined to said element body (20) by ultrasonic fusion, which is applied exclusively to an outer peripheral portion (210) of said sealing member (21).

In the above-mentioned fluid filtering apparatus, there may be adopted a structure in which the element body has a filtering member, which contains resin as a binder; and the sealing member is made of material, to which the above-mentioned resin can adhere in a molten state.

In the above-mentioned fluid filtering apparatus, there may also be adopted a structure in which the filtering member is made of a nonwoven fabric containing said resin; and the sealing member is a ring-shaped plate, which is made of felt.

The aforementioned object can also be attained by a filter element (2) of the present invention, which comprises:

an element body (20) having a tubular shape; and a sealing member (21) having a plate-shape, which is joined to at least one of opposite ends of said element body (20);

wherein:

said sealing member (21) is joined to said element body (20) by ultrasonic fusion, which is applied exclusively to an outer peripheral portion (210) of said sealing member (21).

In the above-mentioned filter element, there may be adopted a structure in which the element body has a filtering member, which contains resin as a binder; and the sealing member is made of material, to which said resin can adhere in a molten state.

In the above-mentioned filter element, there may also be adopted a structure in which the filtering member is made of a nonwoven fabric containing said resin; and the sealing member is a ring-shape plate, which is made of felt.

The aforementioned object can also be attained by a method for manufacturing a filter element, which comprises steps of:

placing a sealing member (21) having a plate-shape on an end of an element body (20) having a tubular shape; and applying ultrasonic fusion exclusively to an outer peripheral portion (210) of said sealing member (21) to join said sealing member (21) to said element body (20).

In the above-mentioned method, there may be adopted a limitation in which the element body has a filtering member, which contains resin as a binder; and the sealing member is made of material, to which the resin can adhere in a molten state.

In the above-mentioned method, there may be adopted a limitation in which the filtering member is made of a nonwoven fabric containing the resin; the sealing member is a ring-shaped plate, which is made of felt; and the ultrasonic fusion is carried out by means of a ring-shaped vibration imparting member, which has a diameter substantially identical with a diameter of the outer peripheral portion of the sealing member so that the vibration imparting member can come into contact with the outer peripheral portion.

According to the above-mentioned present invention, change in characteristics of the sealing member (21) due to the ultrasonic fusion occurs only at the outer peripheral portion (210) of the sealing member (21), thus making it possible to ensure a proper resiliency required for a packing at the outer peripheral portion (210) of the sealing member (21). It is therefore possible to bring securely the sealing member (21) over its entire surface into close contact with the holding member (3, 4) utilizing the above-mentioned resiliency so as to seal securely the opposite ends of the filter element (2).

DETAILED DESCRIPTION OF THE PREFERRED EMBODIMENTS

Now, embodiments of a fluid filtering apparatus, a filter element and a method for manufacturing the filter element of the present invention will be described in detail below with reference to the accompanying drawings.

Figure 1:
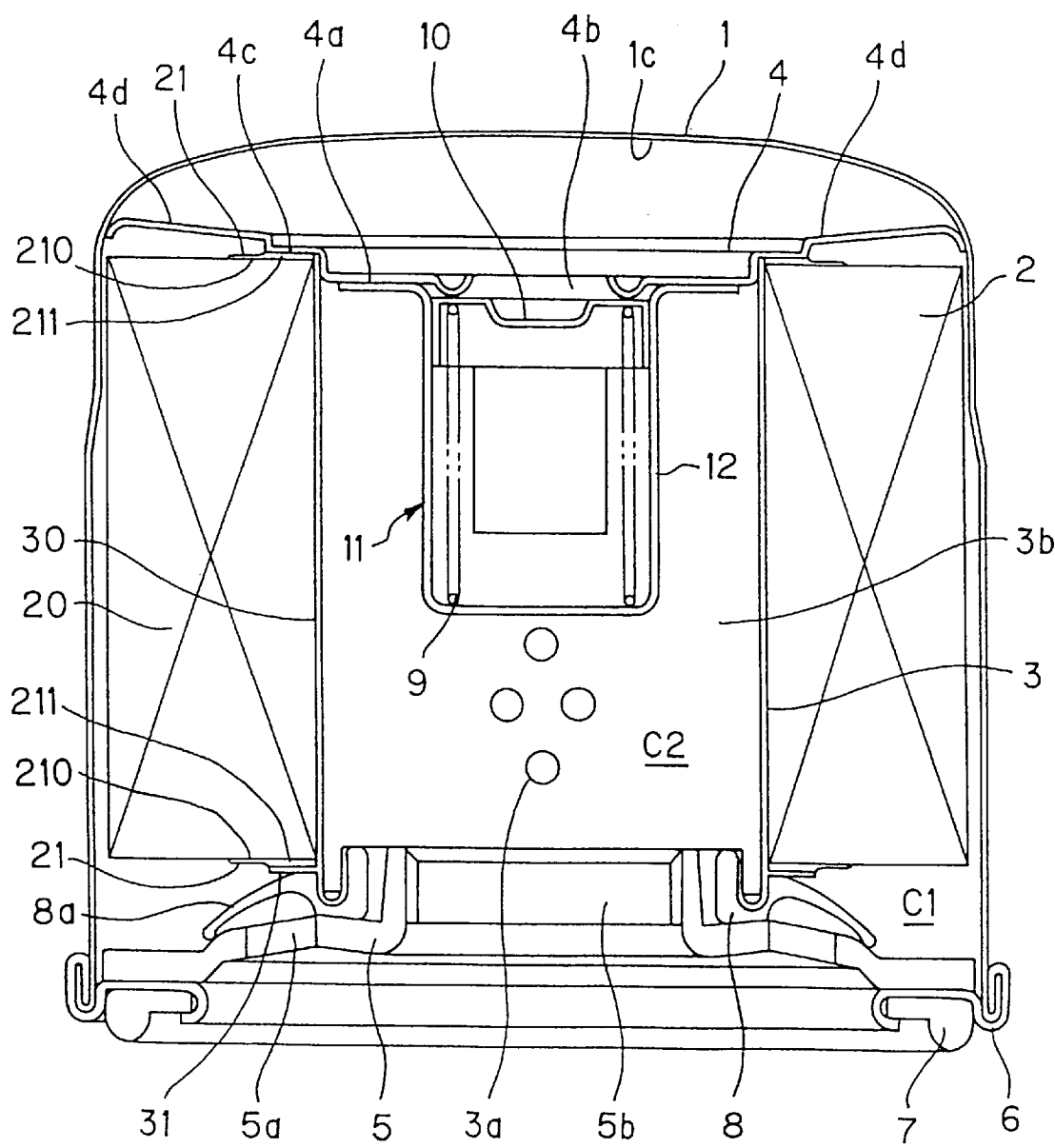
FIG. 1 is a vertical sectional view illustrating a fluid filtering apparatus of the first embodiment of the present invention.

FIG. 1 illustrates the whole constructional concept of an oil filtering apparatus for an engine for an automobile, to which the present invention is applied. The oil filtering apparatus is composed of a filter case 1 made of metal and having a tubular vessel-shape, a filter element 2 received in the inside of the filter case 1, an inner tube 3 made of metal and fitted on the inner periphery of the filter element 2, and a combination of a leaf spring 4 and an end plate 5 between which the filter element 2 is held in its axial direction (i.e., the vertical direction in FIG. 1). A closure plate 6 is fixed the outer periphery of the end plate 5 by a fastening method such as welding. The closure plate 6 and the filter case 1 are secured to each other by placing the outer periphery of the closure plate 6 on the opening end portion of the filter case 1 and then curling them up. The closure plate 6 is provided with a packing 7 fitted thereto, which is to be brought into contact with a member to which the oil filtering apparatus is to be secured.

Figure 2A:
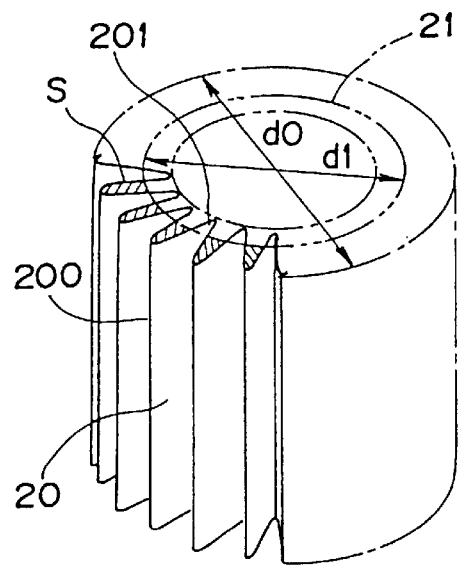
FIG. 2(a) is a perspective view illustrating a filter element used in the filtering apparatus as shown in FIG. 1.
Figure 2B:
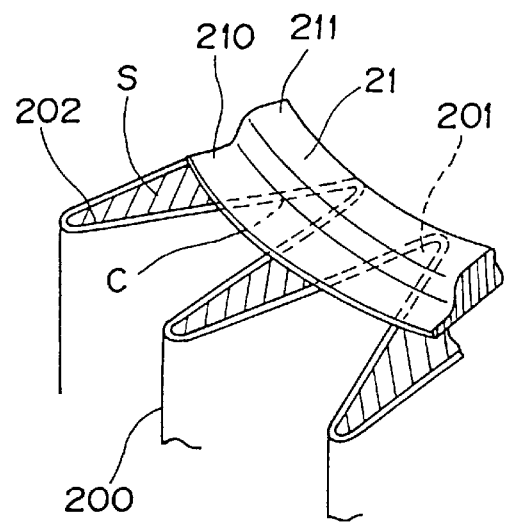
FIG. 2(b) is an enlarged partial view of the filter element as shown in FIG. 2(a)

As illustrated in more detail in FIG. 2(a), the filter element 2 is provided with an element body 20 having a circular tube-shape and a pair of seal plates (i.e., sealing members) 21 each having a circular ring-shape. The element body 20 is obtained by subjecting a prescribed filtering member to a corrugation forming so that crest portions 200 and trough portions 201 alternately appear in the circumferential direction of the element body 20. The seal plates 21 are joined to the opposite ends of the element body 20, respectively, although only the seal plate 21 joined to the one end of the element body 20 is illustrated in FIGS. 2(a) and 2(b). As the filtering member of which the element body 20 is composed, there is used for example a nonwoven fabric, which is obtained by bonding pulp fiber with a binder of polyester resin.

Figure 3A:
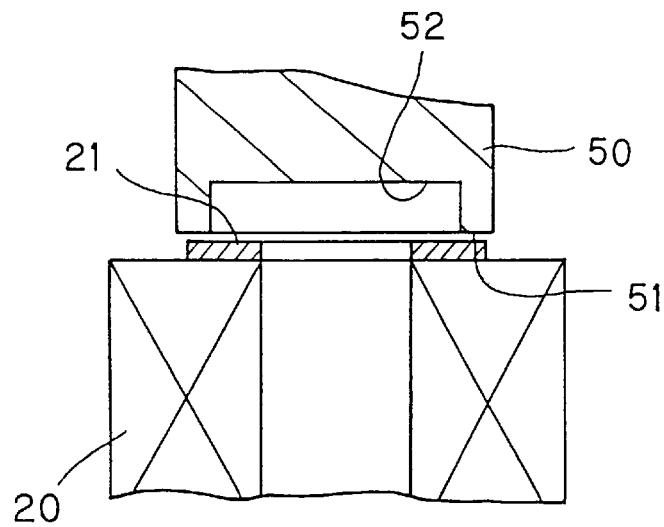
FIGS. 3(a) and 3(b) are schematic views illustrating the joining method of a seal plate of the filter element as shown in FIGS. 2(a) and 2(b)

The seal plate 21 is made of resilient material, which can be used as packing, and of felt for example. The seal plate 21 has an outer diameter d1, which is smaller than the outer diameter d0 of the element body 20. The seal plate 21 is joined to the element body 20 by ultrasonic fusion, which is applied exclusively to the outer peripheral portion of the seal plate 21. The joining of the seal plate 21 is carried out in a manner as shown in FIG. 3(a) for example.

More specifically, the seal plate 21 is placed on the end of the element body 20, which is supported at a prescribed place by a jig (not shown). The other jig 50 serving as an ultrasonic fusing device is placed on the seal plate 21. The jig 50 is provided on its end with a ring-shaped vibration imparting member 51, which is to be brought into contact with the outer peripheral portion 210 of the seal plate 21. The vibration-imparting member 51 has on its inner side a recess portion 52 for preventing the jig 50 from coming into contact with the inner peripheral portion 211 of the seal plate 21. Ultrasonic vibration is imparted to the jig 50 by a vibration source (not shown) under a condition that the vibration imparting member 51 of the jig 50 comes into contact with the outer peripheral portion 210 of the seal plate 21. As a result, ultrasonic vibration is transmitted to the seal plate 21 and the element body 20. The thus imparted ultrasonic vibration causes the occurrence of heat by which the resin as a binder contained in the element body 20 is melted to permeate the outer peripheral portion 210 of the seal plate 21. When the jig 50 is removed after imparting the ultrasonic vibration for a prescribed period of time (for example for 2 seconds), the resin, which has permeated the seal plate 21 is hardened, with the result that the seal plate 21 and the element body 20 are joined to each other.

Figure 3B:
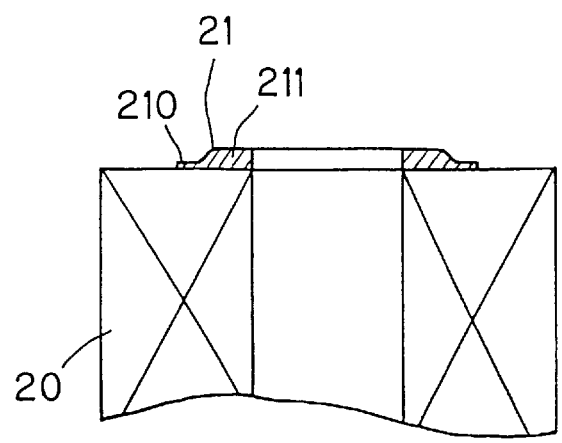

As shown in FIG. 3(b), the outer peripheral portion 210 of the seal plate 21 becomes thin and is hardened along with the curing of the resin, thus leading to loss of resiliency. However, the resin does not permeate the inner peripheral portion 211 of the seal plate 21, with the result that a sufficient resiliency of the seal plate 21 before carrying out the ultrasonic fusion can be maintained. The seal plate 21 can therefore serve as packing utilizing the above-mentioned sufficient resiliency. Incidentally, when the seal plate 21 contains resin components, the resin components contained in the outer peripheral portion 210 of the seal plate 21 is also melted to contribute the joining of the seal plate 21 to the element body 20 on the one hand, and the resin components contained in the inner peripheral portion 211 of the seal plate 21 is not however melted on the other hand so that the sufficient resiliency of the inner peripheral portion 211 of the seal plate 21 can be maintained.

The crest portions 200 of the element body 20 project outward from the seal plate 21 as shown in FIG. 2(b) so that a gap S having a triangular shape (i.e., a hatched region in FIG. 2(b)) is formed between the inner peripheral edge 202 of each crest portion 200 and the outer peripheral edge of the seal plate 21. If these gaps S are left opened, oil introduced into the filter case 1 can unfavorably bypass the element body 20 so as to permit the movement of the oil between the outer peripheral side of the element body 20 and the inner peripheral side thereof through these gaps S. In the filter element 2 as shown in the figures, the gaps S are closed by means of filler (not shown) such as adhesive agent.

Figure 4A:
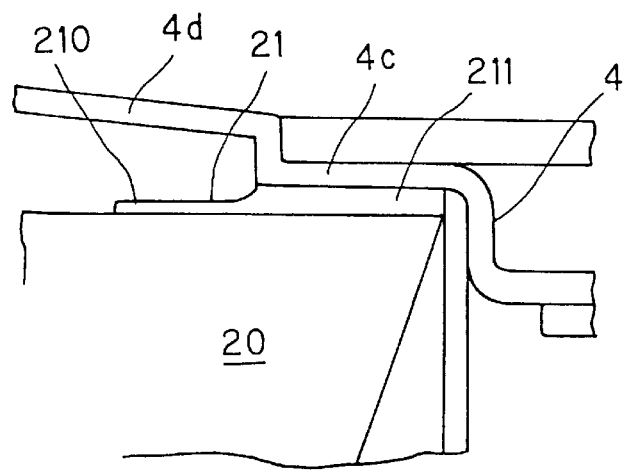
FIG. 4(a) is an enlarged view illustrating a sealed portion of the upper end of the filter element used in the filtering apparatus as shown in FIG. 1.
Figure 4B:
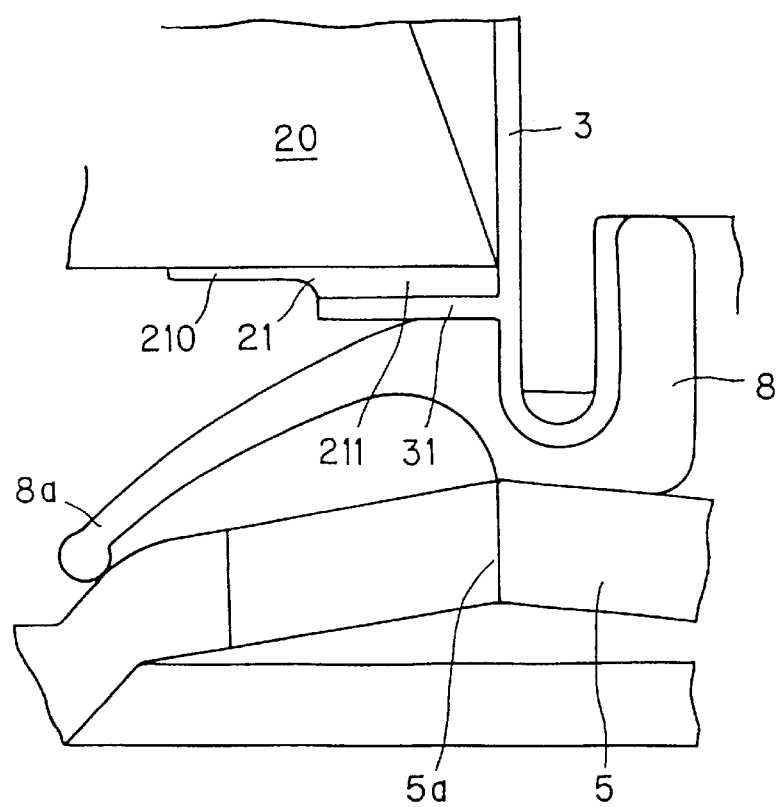
FIG. 4(b) is an enlarged view illustrating a sealed portion of the lower end of the filter element used therein.

A further explanation of the filtering apparatus will be made with reference to FIG. 1. The seal plate 21, which is fitted to the one end (i.e., the upper end in FIG. 1) of the filter element 2 received in the filter case 1 comes into contact with a flange portion 4c of the leaf spring 4. The flange portion 4c is formed into a flat ring-shape, which comes over the entire periphery into contact with the inner peripheral portion 211 of the seal plate 21 (see FIG. 4(a)). The flange portion 4c is provided on its inside with a fitting portion 4a having a circular tube-shape with a bottom, which is to be fitted into the central portion of the filter element 2. The bottom of the fitting portion 4a has a through-hole 4b formed in the center of the bottom. A relief valve 11 is mounted on the fitting portion 4a. The relief valve 11 causes a valve plate 10 to press against the periphery of the through-hole 4b under the function of a coil spring 9 received in a valve housing 12 so as to close the through-hole 4b.

The flange portion 4c of the leaf spring is provided on its outer periphery with a plurality of spring arms 4d . . . 4d, which are spaced apart from each other by a prescribed distance in the circumferential direction. When the filter element 2 is received in the inside of the filter case 1, the outer end portion of these spring arms 4d come into contact with the inner top surface 1c of the filter case 1 so as to cause an elastic deformation of the spring arms 4d. The filter element 2 is pressed toward the end plate 5 under repulsion of the spring arms 4d, which corresponds to the above-mentioned elastic deformation.

The forward end (i.e., the upper end in FIG. 1) of the inner tube 3 inserted into the inner periphery of the filter element 2 is inserted and held between the outer periphery of the fitting portion 4a of the leaf spring 4 and the inner periphery of the filter element 2. The inner tube 3 is provided on its root end side (i.e., the lower side in FIG. 1) with a flange portion 31, which comes over its entire peripheral surface into close contact with the inner peripheral portion 211 of the seal plate 21 disposed on the opposite end side (i.e., the lower side in FIG. 1) of the filter element 2. There is mounted on the root end of the inner tube 3 a packing 8, which comes into close contact with the flange portion 31 and the end plate 5. According to the above-described structure, the opposite ends of the filter element 2 can be sealed over its entire periphery, and the inside of the filter case 1 can be divided into the dirty-side zone C1 located on the outer peripheral side of the filter element 2 and the clean-side zone C2 located on the inner peripheral side thereof.

The end plate 5 is provided with an oil inlet 5a communicating with the dirty-side zone C1 and an oil outlet 5b communicating with the clean-side zone C2. Oil flowing from the oil inlet 5a into the dirty-side zone C1 passes through the filter element 2, and then passes through a plurality of through-holes 3a formed in a cylindrical portion 30 of the inner tube 3 to flow into the clean-side zone C2. Oil introduced into the clean-side zone C2 after completion of filtering process flows from the oil outlet 5b. Some through-holes 3a are merely diagrammatically shown in FIG. 1, and they are however formed uniformly on the cylindrical portion 30 in an actual case. When the pressure in the dirty-side zone C1 exceeds a prescribed value, the valve plate 10 is pressed down so as to be apart from the through-hole 4b, thus permitting to make relief of the dirty-side zone C1 to escape the pressurized fluid from the dirty-side zone C1 into the clean-side zone C2. The packing 8 has a lip portion 8a, which is able to come into contact with the inner surface (i.e., the upper surface in FIG. 1) of the end plate 5. The contact of the lip portion 8a with the inner surface of the end plate 5 prevents a backward flow of oil from the inside of the filter case 1 to the oil inlet 5a.

Figure 5A:
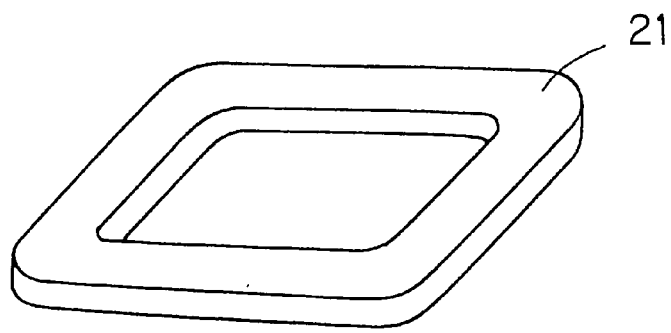
FIGS. 5(a) and 5(b) are perspective views illustrating modifications of the seal plate.
Figure 5B:
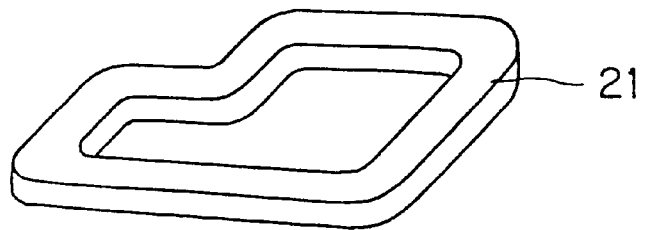

The present invention is not limited only to the above-described embodiments and can be worked in the form of the other embodiments. The filter element 2 is not limited to the corrugation type as shown in FIGS. 2(a) and 2(b), and may be formed into a roll type in which the filter member is rolled in a plural number of turns in the circumferential direction. Materials for the element body 20 and the seal plate 21 may also be changed as long as there are satisfied conditions that at least one of the material for the element body 20 and that for the seal plate 21 contains an element, which is meltable through ultrasonic vibration, and the seal plate 21 has a sufficient resiliency required for a packing. The element body 20 is not limited to a circular tube-shape, but may be formed into the other shape such as a hollow prism-shape. Also the seal plate 21 is not limited to a circular ring-shape, and a rectangular frame-shape (see FIG. 5(a)), the other frame-shape in which one of the corner portions of the above-mentioned rectangular frame-shape is modified (see FIG. 5(b)) or the like may be used selectively in accordance with the shape of the element body 20.

According to the present invention as described in detail, change in characteristics of the sealing member due to the ultrasonic fusion occurs only at the outer peripheral portion of the sealing member, thus making it possible to ensure a sufficient resiliency required for a packing at the outer peripheral portion of the sealing member. It is therefore possible to seal securely the opposite ends of the filter element utilizing the above-mentioned resiliency. The sealing member is joined utilizing the ultrasonic fusion, thus making it possible to reduce the steps and period of time required to the joining in comparison with a case where adhesive agent is used, so as to effect a remarkable reduction in costs. Neither drip nor spew of the adhesive agent occurs on the joined portion of the sealing member, and as a result, the stable quality in the joined portion can be obtained and the problems of the peeling of the sealing member do not occur.

What is claimed is:

1. A fluid filtering apparatus for a vehicle, which comprises:

a filter element provided with an element body having a tubular shape and with sealing members having a plate-shape, a respective sealing member being joined to each of opposite ends of said element body;

a filter case for receiving said filter element; and a pair of holding members, a respective holding member coming into close contact with a corresponding sealing member of said filter element in an axial direction of said filter element so as to divide an inside of said filter case into a dirty-side zone and a clean-side zone, between which said filter element is placed;

wherein:

each sealing member has a closed configuration including an inner peripheral portion and an outer peripheral portion, the sealing member being joined to said element body by ultrasonic fusion, which is applied exclusively to the outer peripheral portion of each sealing member, each inner peripheral portion abutting a respective opposite inner end of the element body and not being joined thereto by ultrasonic fusion, whereby a respective inner peripheral portion has a greater thickness and a greater degree of resiliency than a respective outer peripheral portion.

2. The apparatus as claimed in claim 1, wherein:

said element body has a filtering member, which contains resin as a binder; and said sealing member is made of material, to which the resin can adhere in a molten state.

3. The apparatus as claimed in claim 2, wherein:

said filtering member is made of a nonwoven fabric containing said resin; and the sealing member is a ring-shape plate, which is made of felt.

4. A filter element, which comprises:

an element body having a tubular shape; and a sealing member having a plate-shape, which is joined to at least one of opposite ends of said element body;

wherein:

said sealing member has a closed configuration including an inner peripheral portion and an outer peripheral portion, the sealing member being joined to said element body by ultrasonic fusion, which is applied exclusively to an outer peripheral portion of said sealing member, the inner peripheral portion abutting an inner end of the element body and not being joined thereto by ultrasonic fusion, whereby the inner peripheral portion has a greater thickness and a greater decree of resiliency than the outer peripheral portion.

5. The filter element as claimed in claim 4, wherein:

said element body has a filtering member, which contains resin as a binder; and said sealing member is made of material, to which said resin can adhere in a molten state.

6. The filter element as claimed in claim 5, wherein:

said filtering member is made of a nonwoven fabric containing said resin; and said sealing member is a ring-shape plate, which is made of felt.

7. A method for manufacturing a filter element, which comprises steps of:

providing a sealing member having a plate shape and a closed configuration including an inner peripheral portion and an outer peripheral portion;

placing the sealing member on an end of an element body having a tubular shape; and applying ultrasonic fusion exclusively to the outer peripheral portion of said sealing member to join said sealing member to said element body, the inner peripheral portion abutting an inner end of the element body and not being joined thereto by ultrasonic fusion, whereby the inner peripheral portion has a greater thickness and a greater degree of resiliency than the outer peripheral portion.

8. The method as claimed in claim 7, wherein:

said element body has a filtering member, which contains resin as a binder; and said sealing member is made of material, to which said resin can adhere in a molten state.

9. The method as claimed in claim 8, wherein:

said filtering member is made of a nonwoven fabric containing said resin;

said sealing member is a ring-shape plate, which is made of felt; and said ultrasonic fusion is carried out by means of a ring-shaped vibration imparting member, which has a diameter substantially identical with a diameter of said outer peripheral portion of said sealing member so that said vibration imparting member can come into contact with said outer peripheral portion.

* * * * *